United States Patent
Moyer

(10) Patent No.: US 7,400,317 B2
(45) Date of Patent: Jul. 15, 2008

(54) FINGER NAVIGATION SYSTEM USING CAPTIVE SURFACE

(75) Inventor: Vincent C. Moyer, Milpitas, CA (US)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 383 days.

(21) Appl. No.: 10/651,589

(22) Filed: Aug. 29, 2003

(65) Prior Publication Data
US 2005/0057523 A1    Mar. 17, 2005

(51) Int. Cl.
*G06F 3/033* (2006.01)
(52) U.S. Cl. ............................... 345/157
(58) Field of Classification Search ......... 345/156–167, 345/173, 175
See application file for complete search history.

(56) References Cited

U.S. PATENT DOCUMENTS

| | | | | |
|---|---|---|---|---|
| 4,879,556 A | * | 11/1989 | Duimel ................ | 341/20 |
| 5,446,480 A | * | 8/1995 | Yoshida ................ | 345/157 |
| 5,578,817 A | * | 11/1996 | Bidiville et al. ........ | 250/221 |
| 5,801,681 A | * | 9/1998 | Sayag .................. | 345/157 |
| 6,057,540 A | * | 5/2000 | Gordon et al. .......... | 250/221 |
| 6,326,948 B1 | * | 12/2001 | Kobachi et al. ......... | 345/157 |
| 6,552,713 B1 | | 4/2003 | Van Brocklin et al. | |
| 7,046,229 B1 | * | 5/2006 | Drake .................. | 345/156 |
| 2001/0009414 A1 | | 7/2001 | Badyal et al. | |
| 2001/0019414 A1 | | 9/2001 | Bewersdorf | |
| 2004/0075640 A1 | * | 4/2004 | Liao .................. | 345/156 |
| 2006/0028442 A1 | * | 2/2006 | Bynum et al. .......... | 345/157 |
| 2006/0082549 A1 | * | 4/2006 | Hoshino et al. ........ | 345/157 |

FOREIGN PATENT DOCUMENTS

| JP | 08263198 A | * 10/1996 |
|---|---|---|
| JP | 09016325 A | * 1/1997 |

* cited by examiner

*Primary Examiner*—Amr Awad
*Assistant Examiner*—Stephen G Sherman

(57) ABSTRACT

An apparatus such as a wireless telephone is disclosed, the apparatus having a screen with an icon, and an input device for controlling the icon on the screen. The input device includes a sensor adapted to detect movement and a captive disc movably suspended over the sensor, the captive disc having an active surface facing the sensor and the sensor viewing a portion of the active surface. When the captive disc is moved, the sensor detects differing portions of the active surface and determines movement by changes in its view. Because the captive disc is substantially flat, the input device can be relatively small in size compared to input devices of the current art. The smaller size requirement is advantageous for implementing the input device in various devices including the PDAS, wireless communication devices, and other electronic equipment.

16 Claims, 4 Drawing Sheets

FINGER NAVIGATION SYSTEM USING CAPTIVE SURFACE

BACKGROUND

The present invention relates to computer input devices, and more particularly, to input devices for movement of computer icons on a screen.

Various input devices are in use for manipulating icons such as mouse pointers on screens of computers and various electronic devices. For example, computer mice and trackballs are popular as input devices for desktop computers.

For portable devices (such as personal digital assistants (PDAS) and cellular telephones), touch sensitive pads, joystick controls (for example pointing sticks), and push buttons are popular. However, each of these devices has drawbacks. For example, touch pads require a relatively large input area. In small devices such as wireless telephones, surface area is at a premium. Joystick controls have poor user feedback. This is because joystick controls typically do not move at all; rather, pressure sensors are used to detect user input. Push buttons allow movements only in discrete directions rather than movements in all directions.

Accordingly, there remains a need for a pointing device that eliminates or alleviates these shortcomings.

SUMMARY

The need is met by the present invention. According to a first embodiment of the present invention, an input device includes a sensor adapted to detect movement and a captive disc movably suspended over the sensor. The captive disc has an active surface facing the sensor.

In a second embodiment of the present invention, an input device includes a sensor adapted to detect movement and a captive disc movably suspended over the sensor. The captive disc has an active surface facing the sensor. The input device further includes an illuminant adapted to provide light toward the active surface and a focusing lens focuses light from the active surface onto the sensor. Finally, a horizontal spring is adapted to center the captive disc over the sensor.

In a third embodiment of the present invention, an electronic apparatus includes a screen displaying information including an icon and an input device for controlling the icon. The input device includes a sensor adapted to detect movement and a captive disc movably suspended over the sensor. The captive disc has an active surface facing the sensor.

Other aspects and advantages of the present invention will become apparent from the following detailed description, taken in conjunction with the accompanying drawings, illustrating by way of example the principles of the invention.

DETAILED DESCRIPTION

Figure 1:
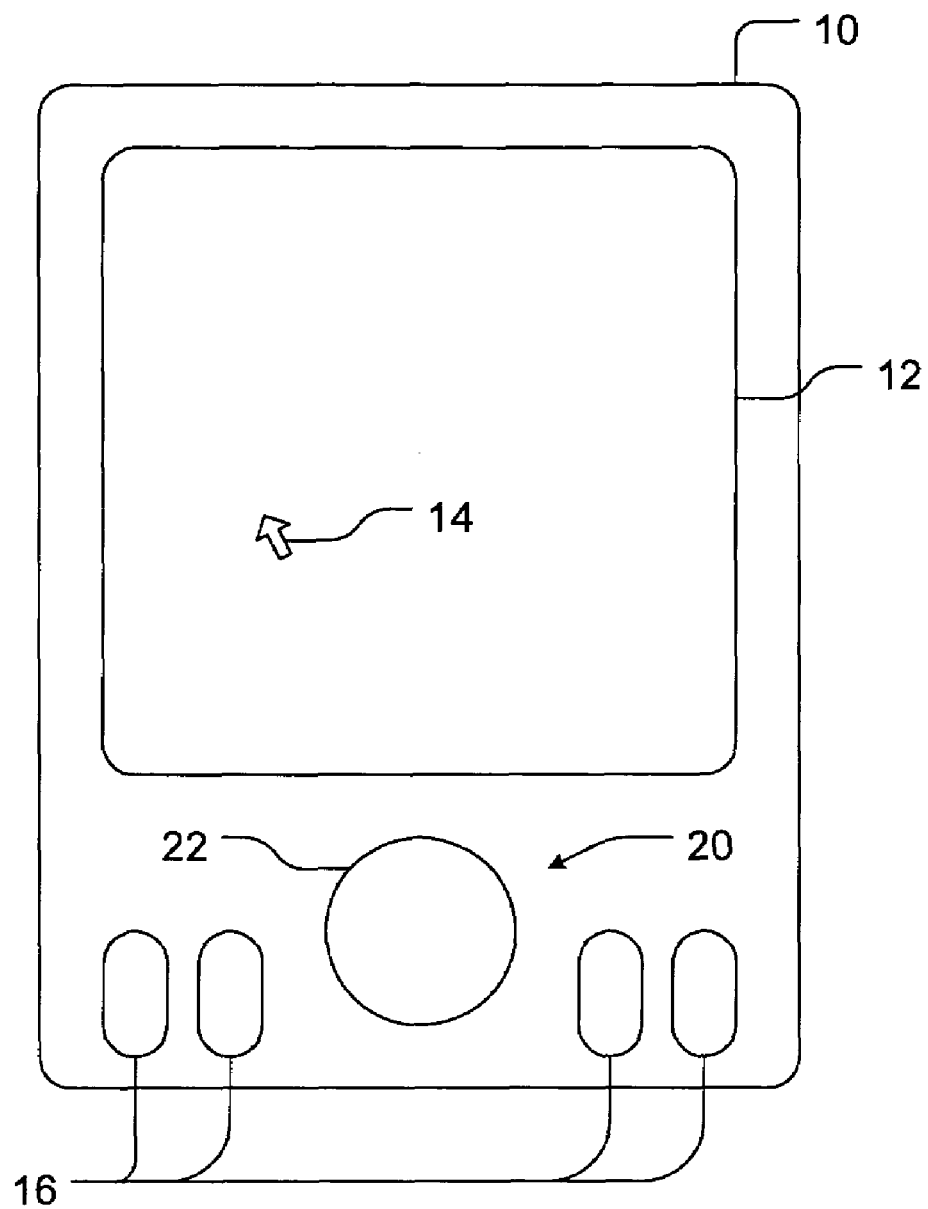
FIG. 1 illustrates a simplified front view of an apparatus in accordance with one embodiment of the present invention including an input device of the present invention.

The present invention will now be described with reference to FIGS. 1 through 3, which illustrate various embodiments of the present invention. As illustrated in the Figures, relative sizes of various portions, structures, or any combination of these are exaggerated for illustrative purposes and, thus, are provided to illustrate the general structures of the present invention.

Various aspects of the present invention are described with reference to a device having a layer, a region, or a structure being on or above other layers, regions, or structures. As will be appreciated by those of skill in the art, references to a layer, a region, or a structure being formed "on" or "above" another layer, another region, or another structure contemplate that additional layer, region, or structure may intervene. References to a layer, a region, or a structure being formed on or above another layer, another region, or another structure without an intervening layer, region, or structure are described herein as being formed "directly on" or "directly above" the other layer, the other region, or the other structure.

Further, relative terms such as "under" or "beneath" may be used herein to describe one layer, region, or structure's relationship to another layer, region, or structure as illustrated in the Figures. It will be understood that these terms are intended to encompass different orientations of the device in addition to the orientation depicted in the Figures. For example, if the device in the Figures is turned over, layers, regions, or structure described as "under" or "beneath" the other layer, region, or structure would now be oriented "over" or "above" these other layers, regions, or structures. As such, the terms "under" or "beneath" are intended to encompass both over and above depending upon orientation of the Figures, context, or both in such situations. Likewise, the terms "over" or "above" are intended to encompass both under and beneath depending upon orientation of the Figures, context, or both in such situations. Additionally, terms "over" and "under" are intended to encompass relative positional phrases "right of" or "left of" in case such devices or apparatuses are turned on its side, and "front of" or "back of" in case such devices or apparatuses are turned on its end. Like numbers refer to like elements throughout.

As shown in the figures for the purposes of illustration, one embodiment of the present invention is exemplified by an electronic apparatus, for example a PDA or a wireless mobile communication device. The sample apparatus includes a screen displaying an icon such as a cursor or an arrow-type pointer. The apparatus is configured or programmed to have the pointer move around the screen in response to input from an input device having a sensor and a captive disc.

The input device of the present invention requires less space than a touch pad, allows movements in all directions, and provides feedback to the user via actual movements of the captive disc. Accordingly, the input device of the present invention eliminates or alleviates the shortcomings of the prior art devices.

FIG. 1 illustrates a simplified front view of an apparatus 10 in accordance with one embodiment of the present invention including an input device of the present invention. The apparatus 10 includes a screen 12 for displaying information including an icon 14 such as a pointing arrow or a cursor. The apparatus 10 includes an input device 20 for controlling the icon. The input deice 20 is accessible to a user via a front opening 22. The apparatus 10 can include other input devices such as input buttons 16 or even a keyboard (not illustrated). The apparatus 10 can be, for example, wireless communication device such as a cellular telephone.

Figure 2A:
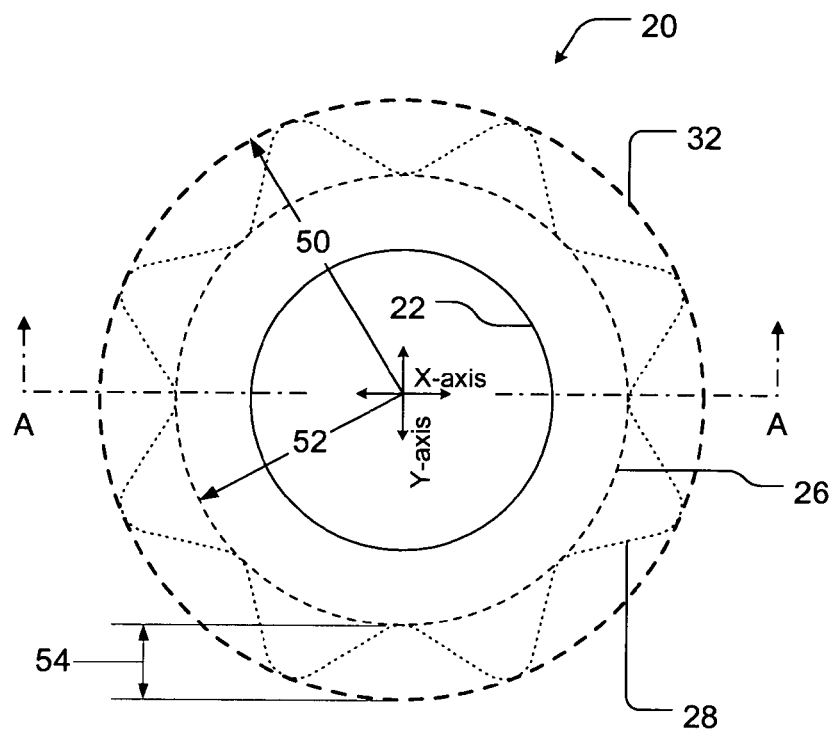
FIG. 2A illustrates a more detailed front view of a portion of the apparatus of FIG. 1 including the input device of the present invention.
Figure 2B:
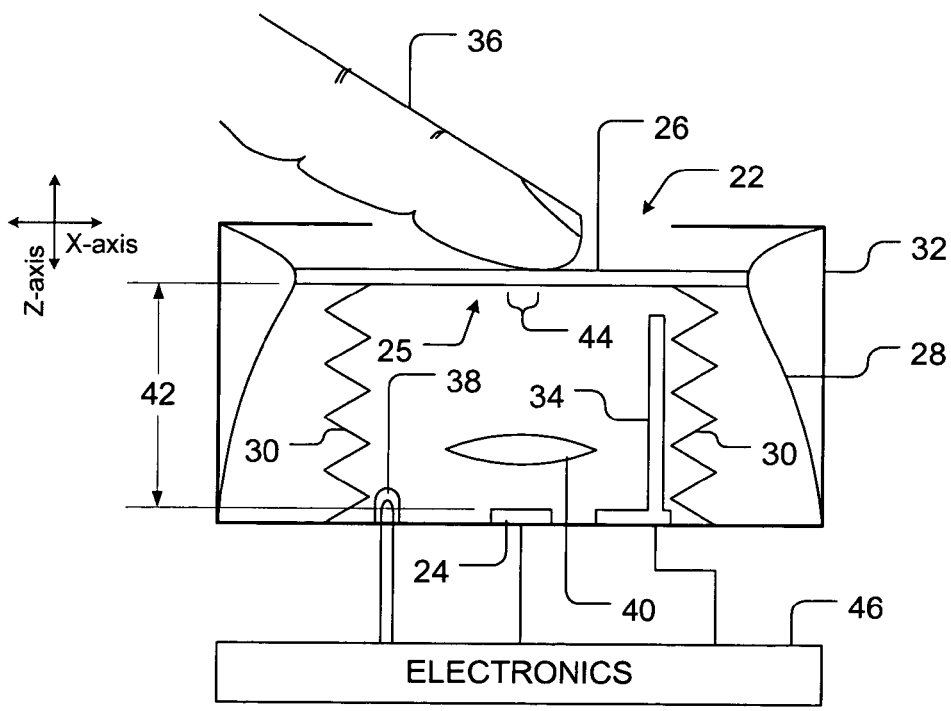
FIG. 2B illustrates a cut-away side view of the input device illustrated in FIG. 2A cut along line A-A.
Figure 2C:
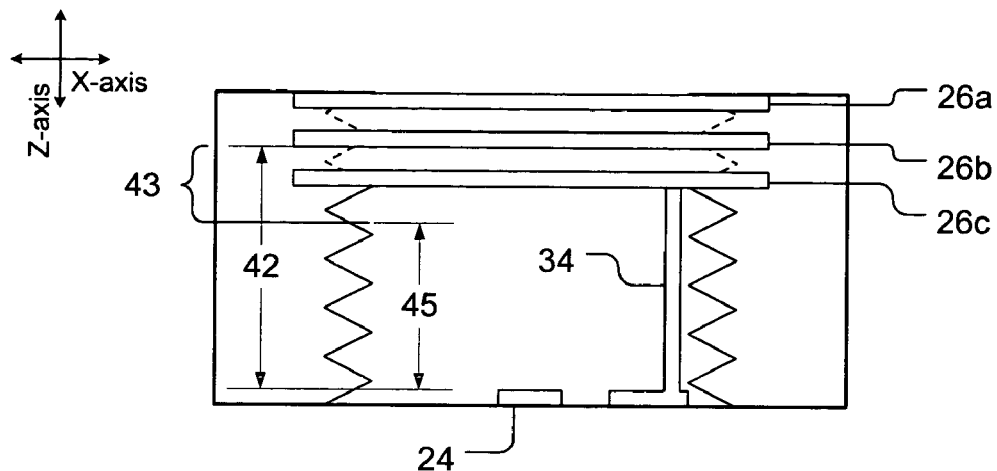
FIG. 2C illustrates various vertical positions of a portion of the input device illustrated in FIGS. 2A and 2B.
Figure 2D:
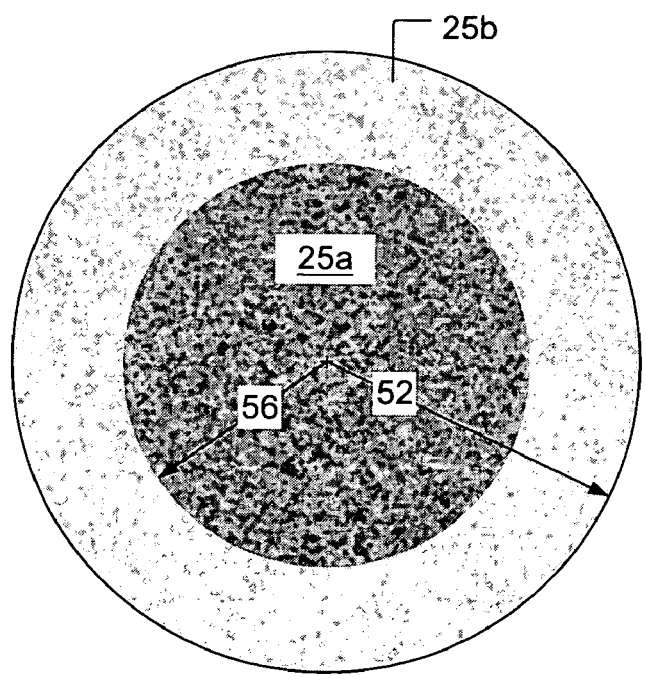
FIG. 2D illustrates one embodiment of a surface of a captive disc of the input device illustrated in FIGS. 2A through 2C.

FIG. 2A is a more detailed front view of portions of the apparatus 10 of FIG. 1 including the input device 20. FIG. 2B is a cut-away side view of the input device 20 illustrated in FIG. 2A cut along line A-A. FIG. 2C illustrates different operating states of the input device 20 illustrated in FIG. 2A. FIG. 2D illustrates one embodiment of a surface of a captive disc of the input device illustrated in FIGS. 2A through 2C.

Referring to FIGS. 2A to 2D, the input device 20 includes a sensor 24 adapted to detect movement. Motion is detected, quantified, and reported by the optical navigation sensor 24 such as the model ADNS-2030 available from Agilent Technologies, Inc. Other models from Agilent as well as other sensors from other manufacturers can be used. The sensor 24 uses an integrated circuit to capture images of the tracking surface. Successive images are compared mathematically to determine the magnitude and the direction of motion in the X and Y axes. The sensor 24 has a communication port to pass the displacement values to other circuits and electronics 46. The sensor 24 detects movements of a captive disc 26 which is movably suspended over the sensor 24 by a horizontal spring 28 and a vertical spring 30.

The captive disc 26 has an active surface 25 that faces, or is directed toward, the sensor 24 and a user surfaces that is directed away from the sensor 24. FIG. 2D illustrates one embodiment of the active surface 25. The term "spring" used herein includes any and all materials, structures, or both configured to provide spring and spring-like functions described herein and includes, without limitation, metallic springs, elastomer blocks, gel bags, and other structures. Furthermore, the horizontal and vertical springs 28 and 30 can be implemented as one structure providing horizontal and vertical tensions and pressures described herein. For convenience, the horizontal and vertical springs 28 and 30 are discussed herein as two separate entities.

The captive disc 26 is movable within its plane in any direction along the X-axis, Y-axis (as defined by the plane of the disc 26 itself), or in any combination of these axes. The horizontal spring 28 surrounds the captive disc 26 and provides horizontal tension toward the center. At rest position, the captive disc 26 is at the center of a frame 32 housing the captive disc 26 as illustrated in FIG. 2A. For clarity, movements of the captive disc 26 within its plane is referred to as horizontal movements or movements in X and Y axes. The frame 32, along with the captive disc 24, provides an enclosed and protected space within the frame 32 for protection against external contaminants such as dirt, liquid, or other foreign particles.

Additionally, the captive disc 26 is movable vertically, in Z-axis as illustrated in FIGS. 2B and 2C. The vertical spring 30 supports the captive disc 26 and provides vertical tension toward the front (as illustrated in FIGS. 1 and 2A) or top (as illustrated in FIG. 2B). FIG. 2C illustrates the captive disc 26 in three different vertical positions, or planes. At the rest position, vertical tension from the vertical spring 30 pushes the captive disc 26 "up" toward the opening 22 resulting in the captive disc 26 resting against the opening 22 at a rest plane. This is illustrated in FIG. 2C as the captive disc 26a. The frame 32 defines a frame area, for example, a circular area, having a frame radius 50. The captive disc 26 has a disc radius 52.

When pressure is applied to the captive disc 26a (such as by a finger 36 of a user), the captive disc 26a is pushed "down" to a focal plane level. The captive disc 26 at the focal plane level is illustrated in FIG. 2C as captive disc 26b. In FIG. 2B, the captive disc 26 is illustrated at the focal plane level. To select an item on the screen 12 of FIG. 1, the captive disc 26 is pushed further down to a selection plane level thereby activating a selection switch 34. The captive disc 26 at a selection plane level is illustrated in FIG. 2C as captive disc 26c. Activation of the selection switch 34 is analogous to pressing a button on a traditional computer mouse.

For convenience, the captive disc 26, generically, is referred to using reference numeral 26 except when discussing specific vertical position of the captive disc 26 where reference numerals 26a, 26b, and 26c are used to refer to the captive disc 26 at the rest position, focal plane level, and selection plane level, respectively. For clarity, "up" and "down" movements of the captive disc 26 is referred to as movements in Z-axis.

The captive disc 26, the horizontal spring 28, and the vertical spring 30 are housed within a frame 32. The frame 32 can be defined by the apparatus 10. The horizontal spring 28 is within the frame 32 and is supported by the frame 32. The vertical spring 30 is within the frame 32 and is supported by the frame 32.

As illustrated, in one embodiment of the present invention, the captive disc 26 is substantially flat. Accordingly, the input device 20 requires much less space than some other input devices such as a trackball that uses a spherical ball.

A light source 38 provides illumination for the active surface 25 of the captive disc 26. Light reflecting from the active surface 25 is focused on the sensor 24 by focusing lens 40. The sensor 24 and the focusing lens 40 can be designed to have a relatively narrow depth of field to minimize the size of the input device 20; however, the depth of field of the sensor 24 is implementation dependent. The lens 40 may not be necessary depending on the maximum focal distance 42 of the sensor 24 and the distance between the sensor 24 and the active surface 25. When present, the focusing lens 40 focuses light from a portion of the active surface 25 to the sensor 24 when the active surface 25 is at or proximal to the focal plane level 26b. In some implementations, the light from the light source 38 can be focused on the active surface 25 using a light source lens, separate from the focusing lens 40. To avoid clutter, the light source lens is not illustrated in the Figures.

Figure 2E:
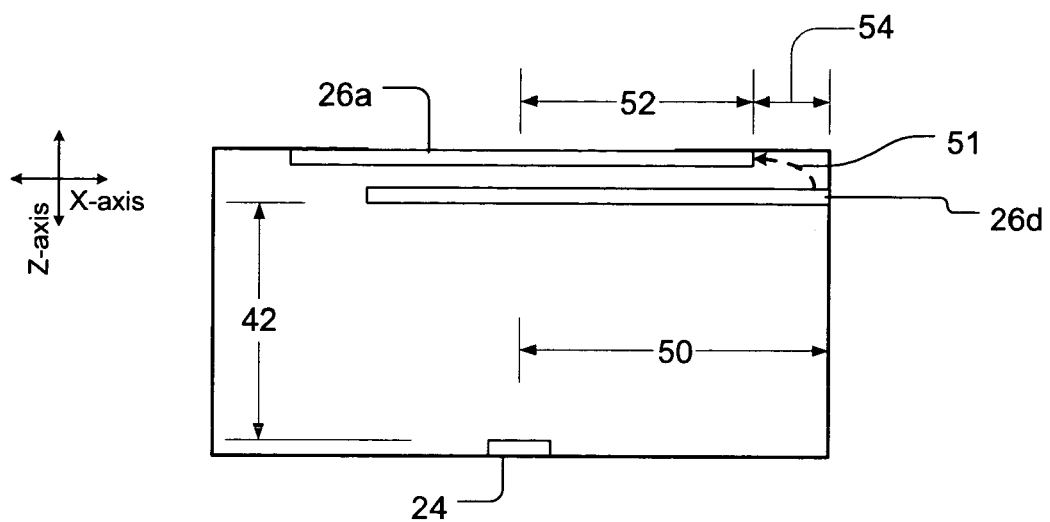
FIG. 2E illustrates a return movement of a portion of the input device illustrated in FIGS. 2A and 2C.

In the embodiment illustrated in FIGS. 1 through 2E, the sensor 24 is adapted to sense images at or proximal to a focal area 44 within a focal distance range 43. The focal distance range 43 is a range of focal distances from the sensor 24 within which the sensor 24 is focused. The focal distance range 43 is between a maximum focal distance range 42 and minimum focal distance range 45 of the sensor 24. Here, phrase "focal plane" includes any plane having X-Y axes that is within or proximal to the focal distance range 43 in Z-axis. The sensor 24 views and detects changes of patterns that fall within the focal area 44 and converts these changes as movements of the captive disc 26 provided that the captive disc 26 is at a distance that is within the focal distance range 43. This configuration can be accomplished by internal design of the sensor 24 or more often by using the focusing lens 40. The focal area 44 is a relatively small area within the focal plane.

The captive disc 26 has the active surface 25 one embodiment of which is illustrated in FIG. 2D. Continuing to refer to FIGS. 2A through 2D, the active surface 25 includes a navigation area 25a and a border area 25b generally surrounding the navigation area 25a. The navigation area 25a generally occupies center of the active surface 25 in a circular fashion (for a circular disc) has a predetermined pattern. The predetermined pattern can be a random pattern or a designed navigable pattern. The predetermined pattern can be designed such that changes in the predetermined pattern (from movements of the captive disc 26) are easily interpreted by the sensor 24. Radius 56 of the navigation area can be, for example, approximately 80 percent of the radius 52 of the disc 26.

In the illustrated sample embodiment of FIG. 2D, the navigation area 25a is a random area. The border area 25b is also a random surface which has lower density than the navigation area 25a. Therefore the disc 26 can be used for tracking, and for border detection. The lower density area 26b could be made to defocus more quickly than the center for undesired motion suppression.

Initially, the captive disc 26 is at a rest plane as captive disc 26a. At this state, the active disc 25 is out of the focus of the sensor 24. Here, the user is represented by the finger 36 in FIG. 2B. To move the icon 14 of FIG. 1, the finger 36 presses the captive disc 26 moving the captive disc 26 in Z-axis such that the active surface 25 comes within the focal plane thereby bringing portions of the active surface onto focus of the sensor 24. Further, initially, captive disc 26 is centered relative to the frame 32 or the opening 22. Therefore, the sensor 24 views the center of the navigation area 25a. Pushing the captive disc 25 down causes the active surface 25 to come into focus and its motions in the X-Y direction are reported by the sensor 24.

As the captive disc 26 is moved (in the X-axis and the Y-axis directions) within the focal plane (in the Z-axis), different portions of the navigation area 25a enters and leaves the focal area 44 projected onto (thus viewed by) the sensor 24. The sensor 24 detects the movements and communicates the movements to circuits and electronics 46 outside the input device 20 but internal to the apparatus 10 of FIG. 1. Also connected to the electronics 46 are the light source 38 and the selection switch 34. For convenience, movements of the captive disc 26 in the X-axis, in the Y-axis, or a combination of these axes are referred to as horizontal movements; movements of the captive disc 26 in the Z-axis are referred to as vertical movements.

The frame 32 limits the horizontal movements of the captive disc 26. In fact, horizontally, the captive disc 26 is limited to movements, in any one direction, to a horizontal clearance 54 value where the horizontal clearance is the difference between the frame radius 50 and the captive disc radius 52. After moving the captive disc 26, in any horizontal direction, to the end of its horizontal clearance, the user releases the captive disc 26 to allow it to return to its rest position 26a so that the captive disc 26 can be used again.

FIG. 2E illustrates the return movement 51 of the captive disc 26 from the end of its horizontal clearance (represented by captive disc 26d) to its rest position (represented by captive disc 26a). Referring to FIGS. 2A through 2E, when the captive disc 26d is released, pressure from the horizontal spring 28 moves the captive disc 26d toward horizontal center of the frame 32. Further, the vertical spring 30 moves the captive disc 26d up beyond the focal length 42 of the sensor 24. For this reason, during the return movement of the captive disc 26 from the end of its horizontal clearance position 26d to its rest position 26a, the active surface 25 of the captive disc 26 is out of focus of the sensor 24. Therefore, no movement is detected by the sensor 24, thus the icon 14 of FIG. 1 is not moved. Then, after the captive disc 26 returns to its rest position 26a, it is moved again if further movement of the icon 14 of FIG. 1 is desired.

During the return movement of the captive disc 26d, tensions from the horizontal spring 28 and the vertical spring 30 act simultaneously. That is, the captive disc 26d can begin movements in the horizontal direction before the captive surface 25 is completely out of the focus of the sensor 24. In this situation, the return movement of the captive disc 26 may cause the icon 14 of the screen 12 of FIG. 1 to make an undesired move in reverse of the direction the captive disc 26 was moved.

To prevent such undesired reverse movement, the border area 25b can have a distinctive pattern which may be detected by the sensor 24 or by external electronics 46 such that, when portions of the border area 25b is viewed by the sensor 24 during the return movement, motion reporting is suppressed for an appropriate period of time, movement distance, or both. Thus the undesired reverse movement is suppressed. Alternatively, or in combination, to suppressing the reporting of the undesired reverse movement, the border area 25b pattern may be designed such that the image becomes defocused above focal plane 26c thereby suppressing motion detection during the return movement. The suppression method, the defocus method, or both can be implemented as firmware within the sensor 24, the circuits and electronics 46, or both. The border area 25b is a circular area (for a circular disc) and can define the area outside the navigation area 25a to the edge of the disc 26.

The apparatus 10 of FIG. 1 can be configured such that a single translation of the captive disc 26 from center to its extent does not move the icon 14 of FIG. 1 across the entire screen 12 of FIG. 1. This is accomplished using the suppression method, the defocus method, or both as discussed above. The user can lift the finger and continue the icon 14 along the desired path by translating the surface again. The return movement is analogous to "skating" of a traditional computer mouse where, upon reaching an edge of a mouse pad, the user lifts the mouse off from the mouse pad surface, translates the mouse closer to the center of the mouse pad, and lowers the mouse onto the mouse pad to allow further movement of the mouse. Alternatively, the apparatus 10 can be designed such that a single translation of the captive disc 26 causes the icon 14 to travel across the entire screen 12.

Figure 3:
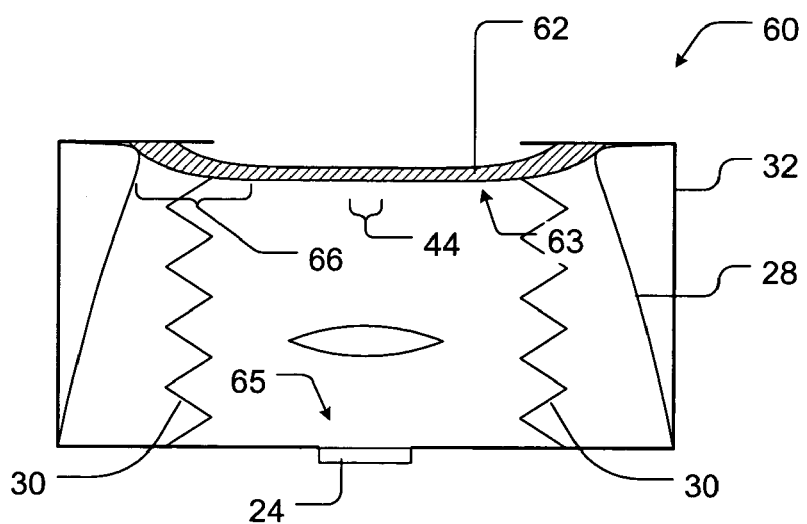
FIG. 3 illustrates a second embodiment of the input device in accordance with the present invention.

An alternative embodiment of the input device 60 having an alternative embodiment of the captive disc is illustrated in FIG. 3. Portions of the input device 60 are similar to corresponding portions of the input device 20 of FIGS. 2A through 2E. For convenience, portions in FIG. 3 that are similar to portions in FIG. 2A through 2E are assigned the same reference numerals and different portions are assigned different reference numerals. Further, to avoid clutter, not all elements of the input device 20 of FIGS. 2A through 2E are illustrated in FIG. 3; however, the input device 60 has at least all of the components illustrated in FIGS. 2A through 2E.

Referring to FIG. 3, the input device 60 includes a convex shaped captive disc 62 rather than a substantially flat captive disc 26 of FIGS. 2A through 2E. In this alternative embodiment, when the convex captive disc 62 is pressed down to or proximal to the focal plane (for example, position illustrated by the captive discs 26b and 26c of FIG. 2C), its active surface 63 comes into focal view of the sensor 24 at the focal area 44. When the convex captive disc 62 is moved to a horizontal limit position (for example, position illustrated by the captive disc 26d of FIG. 2E), convex portion 66 of the convex captive disc 62 is at the focal area 44 of the sensor 24. Because of the convex shape, the convex portion 66 of the active surface 63 is out of focal plane (thus, out of focus) of the sensor 24. Thus, during return movements of the convex captive disc 62, no area of the active surface 63 is in focus of the sensor 24. Accordingly, it is not necessary for the active surface 63 to have a border area such as the border area 25b of active surface 25 as illustrated in FIG. 2D.

Furthermore, in FIG. 3, the sensor 24 is illustrated outside the frame 32. This is an alternative location of the sensor 24 compared to the location of the sensor in FIGS. 2A through 2E. In this case, the sensor views the active surface 63 through a sensor opening 65. In another alternative embodiment, a concave shaped captive disc can similarly be used.

From the foregoing, it will be appreciated that the present invention is novel and offers advantages over the current art. Although a specific embodiment of the invention is described and illustrated above, the invention is not to be limited to the specific forms or arrangements of parts so described and illustrated. For example, the captive disc 26 of FIGS. 2A through 2E is illustrated as a circular disc; however, the present invention is not so limited. The captive disc 26 can have other forms and shapes such as triangular, rectangular, or polygon shape. The invention is limited by the claims that follow.

What is claimed is:

1. An input device comprising:
    a captive disc movably suspended over a sensor, said captive disc having an active surface facing said sensor, the active surface having a predetermined pattern;
    wherein said sensor is adapted to take successive images of the predetermined pattern of the active surface of said captive disc and compare the successive images of the predetermined pattern to determine movement of said captive disc;
    a horizontal spring allowing resistive movement of said captive disc in horizontal directions; and
    a vertical spring allowing resistive movement of said captive disc in vertical directions;
    wherein;
    the horizontal spring returns said captive disc to a horizontal rest position when said captive disc is released;
    the vertical spring returns said captive disc to a rest plane when said captive disc is released;
    said sensor determines the movement of said captive disc by taking the successive images of the active surface when said captive disc, in response to finger pressure, is proximal to a focal plane below the rest plane so that the active surface is in focus for said sensor; and
    said sensor does not determine the movement of said captive disc when said captive disc is released, by removal of the finger pressure, from the focal plane so that the active surface becomes out of focus for said sensor;
    wherein;
    said active surface comprises a navigation area having a first pattern and a border area having a second pattern generally surrounding said navigation area; and
    the pattern of the border area has a lower density than the pattern of the navigation area so the border area becomes out of focus for the sensor faster than the navigation area when said captive disc moves from the focal plane to the rest plane.

2. The device recited in claim 1 further comprising:
    frame housing said captive disc; and
    wherein said horizontal spring adapted to center said captive disc within said frame.

3. The device recited in claim 1 wherein the active surface has a convex shape so a border area is out of focus of said sensor when said captive disc is in the focal plane.

4. The device recited in claim 1 wherein:
    said active surface comprises a navigation area and a border area generally surrounding said navigation area; and
    said sensor distinguishes between different patterns of the navigation area and the border area and suppresses any movement determined from the border area.

5. The device recited in claim 1 wherein further comprising focusing lens adapted to focus light from a portion of the active surface to said sensor when the active surface is proximal to the focal plane.

6. The device recited in claim 1 further comprising a selection switch adapted to detect a user selection that moves said captive disc to a selection plane below the focal plane.

7. The device recited in claim 1 further comprising a light source adapted to provide illumination on the active surface.

8. An input device comprising:
    a captive disc movably suspended over a sensor, said captive disc having an active surface facing said sensor, the active surface having a predetermined pattern;
    wherein said sensor is adapted to take successive images of the predetermined pattern of the active surface of said captive disc and compare the successive images of the predetermined pattern to determine movement of said captive disc;
    an illuminant adapted to provide light toward the active surface;
    a focusing lens for focusing light from the active surface onto said sensor;
    horizontal spring adapted to center said captive disc; and
    a vertical spring allowing resistive movement of said captive disc in vertical direction;
    wherein;
    the horizontal spring is adapted to center said captive disc to a horizontal rest position;
    the vertical spring is adapted to return said captive disc to a rest plane;
    said sensor determines the movement of said captive disc by taking the successive images of the active surface when said captive disc, in response to finger pressure, is proximal to a focal plane below the rest plane so that the active surface is in focus for said sensor; and
    said sensor does not determine the movement of said captive disc when said captive disc is released, by removal of the finger pressure, from the focal plane so that the active surface becomes out of focus for said sensor;
    wherein;
    said active surface comprises a navigation area having a first pattern and a border area having a second pattern generally surrounding said navigation area; and
    the pattern of the border area has a lower density than the pattern of the navigation area so the border area becomes out of focus for the sensor faster than the navigation area when said captive disc moves from the focal plane to the rest plane.

9. The device recited in claim 8 wherein the active surface has a convex shape so a border area is out of focus of said sensor when said captive disc is in the focal plane.

10. The device recited in claim 8 wherein:
    said active surface comprises a navigation area and a border area generally surrounding said navigation area; and
    the sensor distinguishes between different patterns of the navigation area and the border area and suppresses any movement determined from the border area.

11. The device recited in claim 8 further comprising a selection switch adapted to detect a user selection that moves said captive disc to a selection plane below the focal plane.

12. An electronic apparatus comprising:
    a screen displaying information including an icon;
    an input device for controlling the icon, said input device comprising:
        a captive disc movably suspended over a sensor, said captive disc having an active surface facing said sensor, the active surface having a predetermined pattern;

wherein said sensor is adapted to take successive images of the predetermined pattern of the active surface of said captive disc and compare the successive images of the predetermined pattern to determine movement of said captive disc;

a horizontal spring allowing resistive movement of said captive disc in horizontal directions; and a vertical spring allowing resistive movement of said captive disc in vertical directions;

wherein;

the horizontal spring returns said captive disc to a horizontal rest position said captive disc is released;

the vertical spring returns said captive disc to a rest plane when said captive disc is released;

said sensor determines the movement of said captive disc by taking the successive images of the active surface when said captive disc, in response to finger pressure, is proximal to a focal plane below the rest plane so that the active surface is in focus for said sensor; and said sensor does not determine the movement of said captive disc when said captive disc is released, by removal of the finger pressure, from the focal plane so that the active surface becomes out of focus for said sensor;

wherein;

said active surface comprises a navigation area having a first pattern and a border area having a second pattern generally surrounding said navigation area; and the pattern of the border area has a lower density than the pattern of the navigation area so the border area becomes out of focus for the sensor faster than the navigation area when said captive disc moves from the focal plane to the rest plane.

13. The apparatus recited in claim 12 further comprising:

frame housing said captive disc; and wherein said horizontal spring adapted to center said captive disc within said frame.

14. The apparatus recited in claim 12 wherein the active surface has a convex shape so a border area is out of focus of said sensor when said captive disc is in the focal plane.

15. The apparatus recited in claim 12 wherein:

said active surface comprises a navigation area and a border area generally surrounding said navigation area; and the sensor distinguishes between different patterns of the navigation area and the border area and suppresses any movement determined from the border area.

16. The apparatus recited in claim 12 wherein further comprising focusing lens adapted to focus the active surface to said sensor when the active surface is proximal to the focal plane.

* * * * *